(12) United States Patent
Yamagata et al.

(10) Patent No.: US 9,118,907 B2
(45) Date of Patent: Aug. 25, 2015

(54) IMAGING DEVICE ENABLING AUTOMATIC TAKING OF PHOTO WHEN PRE-REGISTERED OBJECT MOVES INTO PHOTOGRAPHER'S INTENDED SHOOTING DISTANCE

(71) Applicant: Panasonic Corporation, Kadoma-shi, Osaka (JP)

(72) Inventors: Michihiro Yamagata, Osaka (JP); Kenichi Hayashi, Nara (JP); Keiki Yoshitsugu, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 158 days.

(21) Appl. No.: 13/623,881

(22) Filed: Sep. 21, 2012

(65) Prior Publication Data

US 2013/0076959 A1     Mar. 28, 2013

(30) Foreign Application Priority Data

Sep. 22, 2011 (JP) ................................ 2011-206934
Aug. 29, 2012 (JP) ................................ 2012-189074

(51) Int. Cl.
| | |
|---|---|
| H04N 5/222 | (2006.01) |
| H04N 13/02 | (2006.01) |
| H04N 5/232 | (2006.01) |
| G03B 13/00 | (2006.01) |

(52) U.S. Cl.
CPC ....... *H04N 13/0296* (2013.01); *H04N 5/23212* (2013.01); *H04N 5/23216* (2013.01); *H04N 13/0239* (2013.01); *H04N 5/23222* (2013.01)

(58) Field of Classification Search
CPC ........................... H04N 5/23293; G03B 13/20
USPC ............. 348/333.01–333.03, 333.11–333.12, 348/345–346, 349
See application file for complete search history.

(56) References Cited

U.S. PATENT DOCUMENTS

| | | | |
|---|---|---|---|
| 2009/0087039 A1* | 4/2009 | Matsuura ....................... 382/118 |
| 2010/0020221 A1* | 1/2010 | Tupman et al. .......... 348/333.01 |
| 2010/0020222 A1* | 1/2010 | Jones et al. .............. 348/333.02 |
| 2010/0130250 A1* | 5/2010 | Choi .......................... 455/556.1 |
| 2010/0165114 A1* | 7/2010 | Goh ............................... 348/169 |
| 2011/0317031 A1* | 12/2011 | Honda ........................ 348/229.1 |
| 2012/0019708 A1* | 1/2012 | Morihisa et al. ............... 348/348 |
| 2012/0120277 A1* | 5/2012 | Tsai ........................... 348/223.1 |

FOREIGN PATENT DOCUMENTS

| | | |
|---|---|---|
| JP | 2008-287064 A | 11/2008 |
| JP | 2010-107664 A | 5/2010 |
| JP | 2010-118984 A | 5/2010 |

* cited by examiner

*Primary Examiner* — Kelly L Jerabek
(74) *Attorney, Agent, or Firm* — James W. Judge

(57) ABSTRACT

An imaging device in the present disclosure includes: an imaging unit including an imaging optical system configured to form an image of an object and an imaging element configured to convert an optical image formed by the imaging optical system into an image signal and output the image signal; a distance-measuring section configured to obtain distance information of the object; an image display section configured to display an image of the image signal; an object recording section configured to previously register and record an object to be shot; and a distance designation section configured to designate a distance at which the object is to be shot. The imaging optical system performs a focusing operation for the distance designated by the distance designation section. The imaging unit performs shooting exposure when the object recorded previously by the object recording section is located at the distance designated by the distance designation section.

2 Claims, 7 Drawing Sheets

IMAGING DEVICE ENABLING AUTOMATIC TAKING OF PHOTO WHEN PRE-REGISTERED OBJECT MOVES INTO PHOTOGRAPHER'S INTENDED SHOOTING DISTANCE

CROSS REFERENCE TO RELATED APPLICATION

The disclosure of Japanese Patent Application Nos. 2011-206934, filed on Sep. 22, 2011, and 2012-189074, filed on Aug. 29, 2012, is incorporated herein by reference.

BACKGROUND

1. Field

The present disclosure relates to an imaging device.

2. Description of the Related Art

Japanese Laid-Open Patent Publication No. 2010-118984 discloses a technology that in a photographing device, a first image (tele) and a second image (wide) including at least a portion of an object of the first image are obtained, a main object is detected from the images, and an alarm is issued when the main object is included in the second image and not included in the first image.

Japanese Laid-Open Patent Publication No. 2010-107664 discloses a technology that in a stereoscopic imaging device having a plurality of imaging means, AF search is increased in speed and an image is taken.

SUMMARY

The present disclosure provides an imaging device that allows an image to be automatically taken when a previously-registered object moves to a shooting distance intended by a photographer.

An imaging device according to the present disclosure includes: an imaging unit including an imaging optical system configured to form an image of an object and an imaging element configured to convert an optical image formed by the imaging optical system into an image signal and output the image signal; a distance-measuring section configured to obtain distance information of the object; an image display section configured to display an image of the image signal; an object recording section configured to previously register and record an object to be shot; and a distance designation section configured to designate a distance at which the object is to be shot. The imaging optical system performs a focusing operation for the distance designated by the distance designation section. The imaging unit performs shooting exposure when the object which is previously recorded by the object recording section is located at the distance designated by the distance designation section.

Another imaging device according to the present disclosure includes: a first imaging unit including a first imaging optical system configured to form an image of an object and a first imaging element configured to convert an optical image formed by the first imaging optical system into a first image signal and output the first image signal; a second imaging unit including a second imaging optical system configured to form an image of the object and a second imaging element configured to convert an optical image formed by the second imaging optical system into a second image signal and output the second image signal; an image display section configured to display an image of at least one of the first image signal and the second image signal; an object recording section configured to previously register and record an object to be shot; and a distance designation section configured to designate a distance at which the object is to be shot. The first imaging optical system performs a focusing operation for the distance designated by the distance designation section. The first imaging unit performs shooting exposure when the object which is previously recorded by the object recording section is located at the distance designated by the distance designation section.

The imaging device according to the present disclosure is effective for automatically taking an image when a previously-registered object moves to a shooting distance intended by a photographer.

DETAILED DESCRIPTION

Hereinafter, embodiments will be described in detail with appropriate reference to the drawings. It is noted that a more detailed description than need may be omitted. For example, the detailed description of already well-known matters and the overlap description of substantially same configurations may be omitted. This is to avoid an unnecessarily redundant description below and to facilitate understanding of a person skilled in the art.

It is noted that the inventors provide the accompanying drawings and the following description in order a person skilled in art to fully understand the present disclosure, and do not intend to limit the subject matter defined by the claims.

Embodiment 1

Hereinafter, Embodiment 1 will be described with reference to FIGS. 1A to 5.

[1-1. Configuration]

Figure 1A:
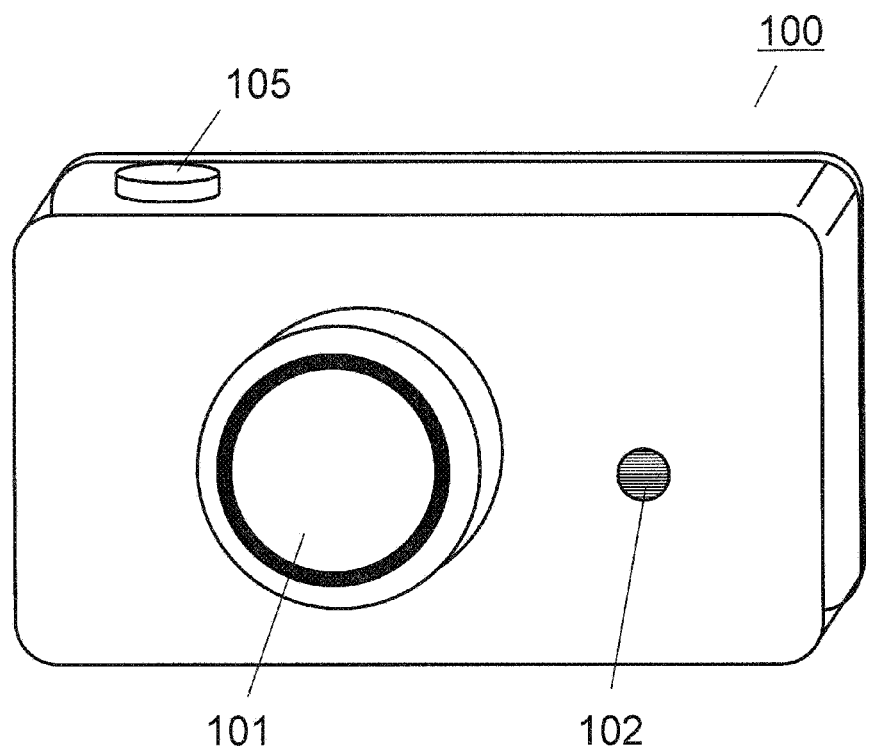
FIG. 1A is an external view of an imaging device according to Embodiment 1.
Figure 1B:
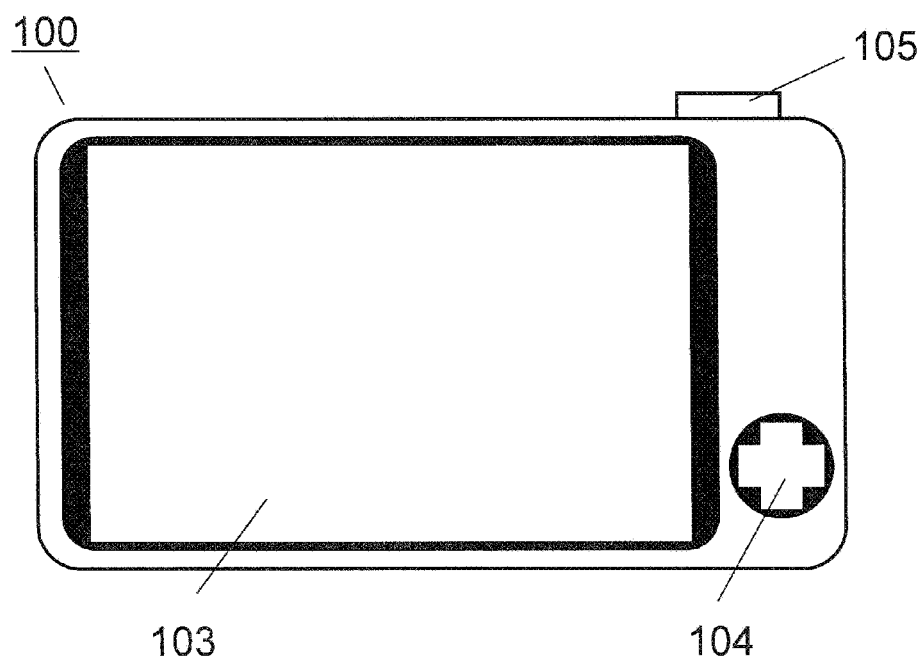
FIG. 1B is a rear view of the imaging device according to Embodiment 1.

FIG. 1A is an external view of an imaging device according to Embodiment 1, and FIG. 1B is a rear view of the imaging device according to Embodiment 1. The imaging device 100 shown in FIGS. 1A and 1B includes a shooting lens 101, a distance-measuring section 102, an image display section 103, and a distance designation section 104, and a shutter button 105.

Figure 2:
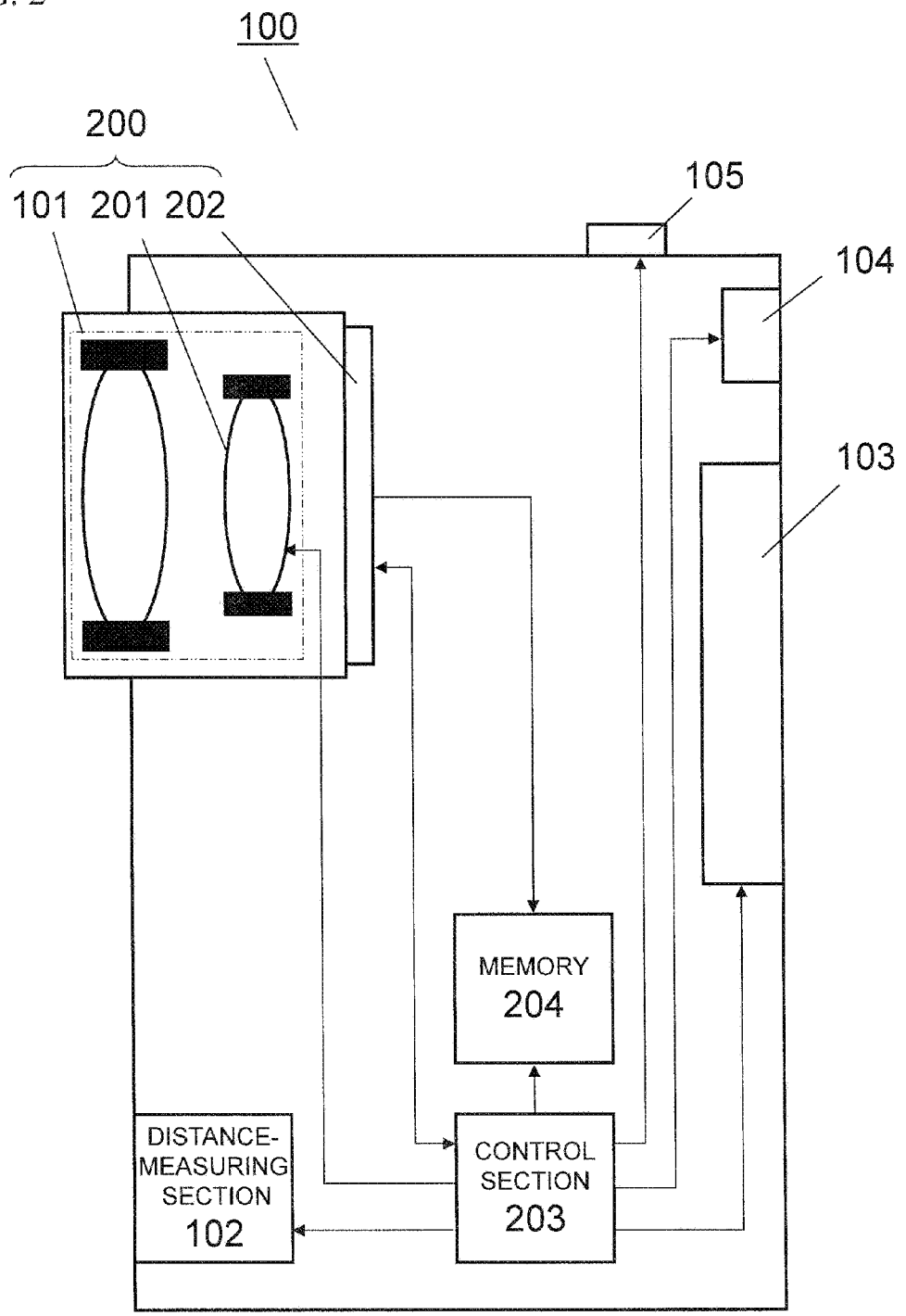
FIG. 2 is a block diagram for illustrating the internal configuration of the imaging device according to Embodiment 1.

FIG. 2 is a block diagram showing the internal configuration of the imaging device shown in FIGS. 1A and 1B.

In FIG. 2, an imaging unit 200 includes an imaging element 202 and an imaging optical system 101 which includes a plurality of lenses for forming a shot image on the imaging element 202.

The imaging optical system 101 has a function to shift a focus lens 201 to achieve focus.

The imaging element 202 is a photoelectric conversion device which converts a formed object image into an electrical signal (image signal), and corresponds to, for example, a CCD image sensor or a CMOS image sensor.

The image display section 103 displays an image signal obtained from the imaging unit 200. The image display section 103 is, for example, a liquid crystal display or an organic EL display.

The distance designation section 104 is an input device used for designating a distance at which a photographer desires to take an image. The distance designation section 104 is, for example, a cross key, a button, a zoom lever, a touch panel, or the like, provided in the imaging device 100.

In a memory 204, information on an object which is desired to be shot is previously recorded. The memory 204 is, for example, a buffer memory, a hard disc, or a semiconductor memory.

The distance-measuring section 102 is a sensor for sequentially measuring the distance from the imaging device 100 to an object. The distance-measuring section 102 corresponds to, for example, a sensor which irradiates a target (object) with infrared light, ultrasonic wave, or the like and detects a distance on the basis of the irradiation angle or a time taken until its reflected wave returns.

A control section 203 shifts the position of the focus lens 201 within the imaging optical system 101 so as to achieve focus at a shooting distance inputted by the distance designation section 104. In addition, the control section 203 controls recording of a signal into the memory 204 and reading of a signal from the memory 204. Furthermore, the control section 203 controls the imaging unit 200 to perform shooting exposure when the distance to an object becomes a predetermined distance. The control section 203 can be realized by, for example, a microcomputer provided in the imaging device 100. However, the control section 203 may be physically configured in any manner as long as it can control each section of the imaging device 100. When the control section 203 is realized by using a programmable microcomputer, process contents can be changed by changing a program, and thus flexibility in designing the control section 203 can be increased. In addition, the control section 203 may be realized by hard logic. Furthermore, the control section 203 may be composed of a single element or a plurality of elements.

Figure 3:
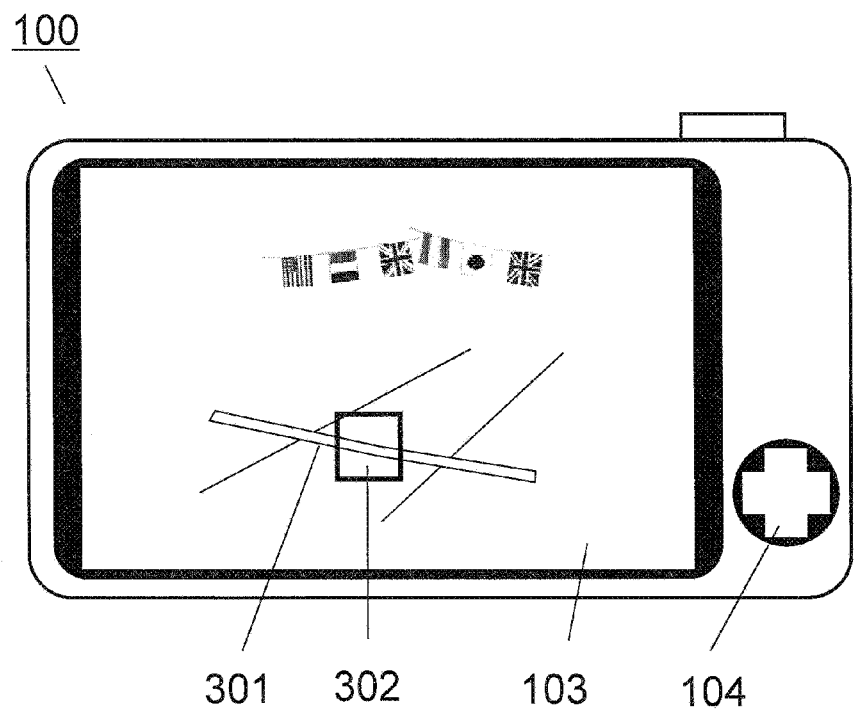
FIG. 3 is a diagram showing an example of designation of a shooting distance in Embodiment 1.

FIG. 3 is a diagram illustrating an operation of designating a distance at which shooting is desired. A photographer designates an object 301 at a distance at which shooting is desired, by operating the distance designation section 104. In this case, a frame 302 indicating which position on a composition the position of the object 301 at the distance at which shooting is desired corresponds to is displayed on the image display section 103 so as to be overlaid on an image, whereby the operation is facilitated. It is noted that a display for specifying the object 301 at the distance at which shooting is desired is not limited to the frame 302 illustrated in FIG. 3 and may be in any form.

Figure 4:
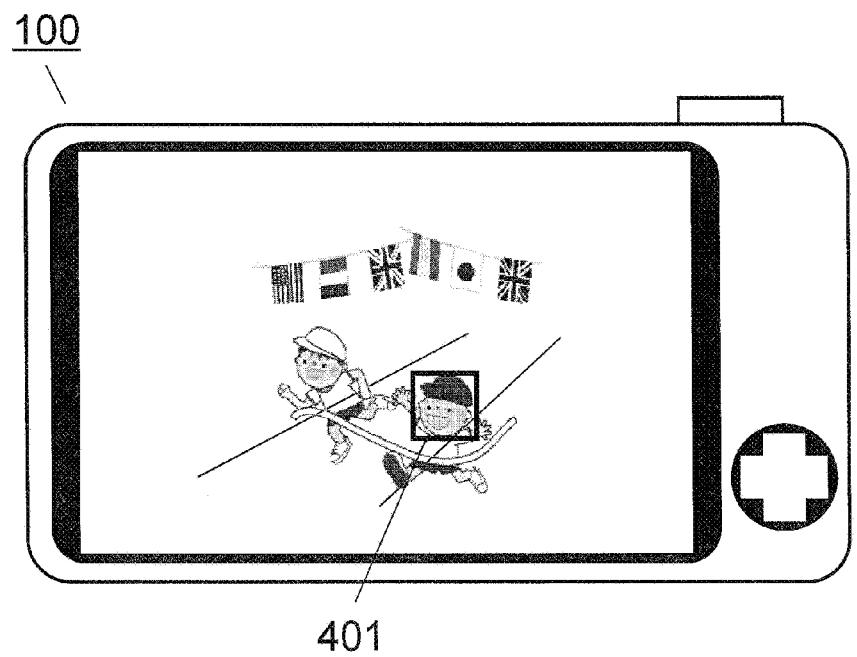
FIG. 4 is a diagram showing an example of a shooting scene in Embodiment 1.

FIG. 4 is a diagram showing a situation in which shooting exposure is performed when a previously-registered object 401 moves to the position of the object 301 at the distance at which shooting is desired.

[1-2. Operation]

Figure 5:
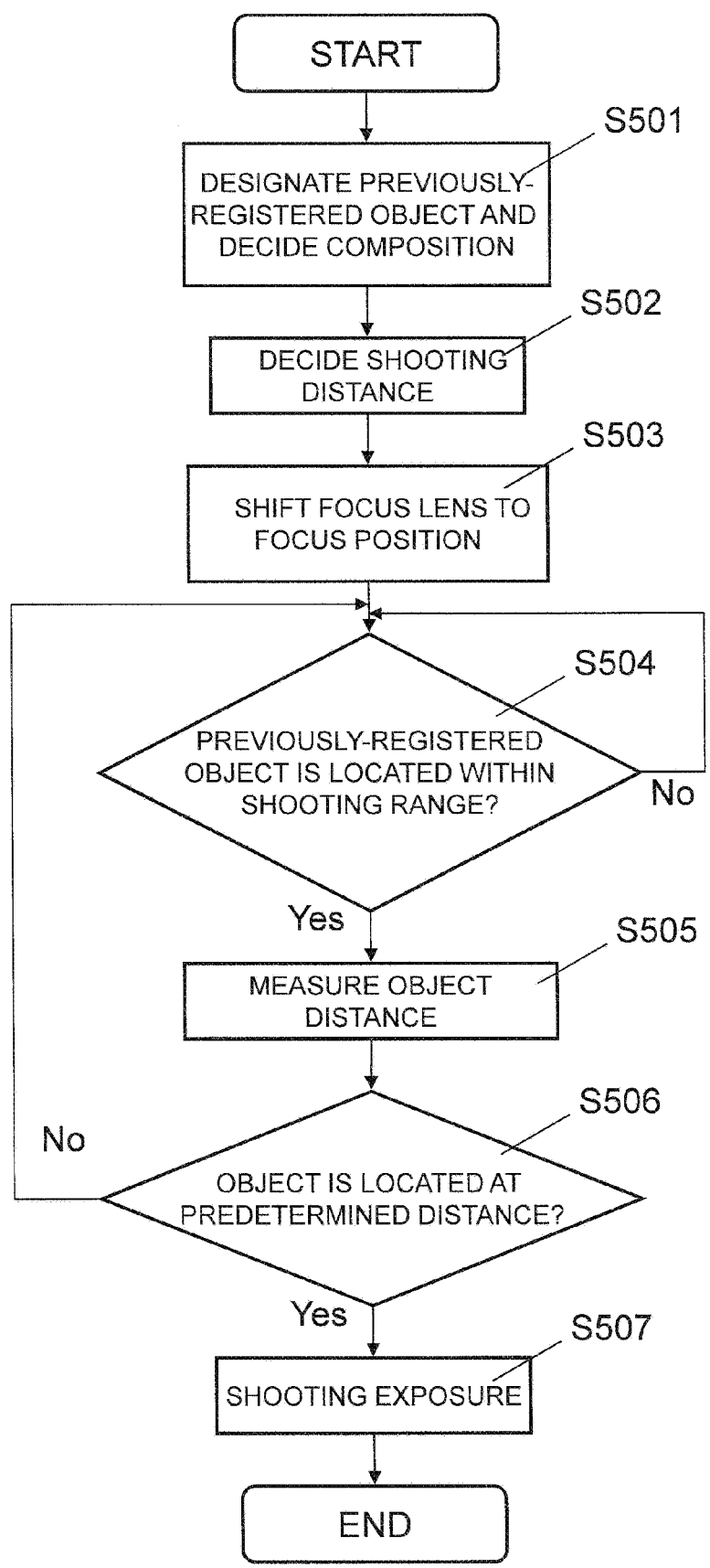
FIG. 5 is a flowchart showing a series of process contents in Embodiment 1.

Hereinafter, an operation of the imaging device configured thus according to Embodiment 1 will be described with reference to FIG. 5.

First, at a stage of preparation for shooting, the photographer designates information on the previously-registered object 401 and decides a composition with which shooting is desired (S501). The information on the object 401 may be an image or thumbnail of the object 401, characters or an icon for identifying the object 401, or the like. In addition, the information on the object 401 can be designated by using a cross key, a button, a zoom lever, a touch panel, or the like, provided in the imaging device 100. Next, the photographer designates, on the composition, a shooting distance which is such that an image is taken when the previously-registered object 401 moves to the shooting distance. Specifically, the photographer designates the object 301 at a distance at which shooting is desired, by using the distance designation section 104. The distance-measuring section 102 measures the distance to the object 301 designated by the distance designation section 104 (S502). The imaging device 100 adjusts the focus lens 201 of the imaging unit 200 to the focus position designated at S502 (S503).

Next, the control section 203 determines whether an image of the previously-registered object 401 is located within a shooting range of the imaging device 100 (S504). When the previously-registered object 401 is located within the shooting range (Yes at S504), the control section 203 controls the distance-measuring section 102 to measure the distance to the object 401 (S505). When the previously-registered object 401 is not located within the shooting range (No at S504), the control section 203 continues detection of the object (S504).

Subsequently, on the basis of the result of the distance measurement, the control section 203 determines whether the distance to the previously-registered object 401 is equal to a predetermined distance, namely, the distance to the designated object 301 (S506). When the distance to the object 401 is different from the distance to the object 301 at the position at which shooting is desired (No at S506), the control section 203 continues detection of and distance measurement for the object 401. On the other hand, when the distance to the object 401 is equal to the distance to the object 301 at the position at which shooting is desired (Yes at S506), the control section 203 controls the imaging unit 200 to perform shooting exposure to obtain an image (S507).

[1-3. Advantageous Effects etc.]

In recent years, digital cameras have been widely popularized, and various improvements have been made in order to more easily take an image without failure. Among shooting scenes, it is one of difficult shooting scenes to appropriately capture a moving object. A method for assisting this has been proposed.

When taking an image, a photographer operates the shutter button of a camera to perform a focusing operation of a shooting lens, and then takes an image. Therefore, when an object moves in a direction in which the distance between the object and the camera changes, the following problems arise due to the time lag from the focusing operation to the shooting: shooting with a composition intended by the photographer cannot be performed, and an imaging lens becomes out of focus. As a shooting method for the case where the object moves as described above, a method is used in which the imaging lens is previously focused at a distance at which shooting is desired, and the shutter button is pressed when the object moves to this distance. However, with a camera that does not has a manual focus adjustment mechanism, an operation for that is complicated. Moreover, even when an image is taken by the method in which the imaging lens is previously focused at a distance at which shooting is desired, the time lag between the time when the object comes to a predetermined distance and the time when the photographer presses the shutter button varies due to the skill of the photographer. Thus, it takes considerable skill to obtain a favorable picture.

In contrast, according to Embodiment 1, a shooting operation is assuredly performed when an object which is desired to be shot moves to a distance at which shooting is desired. Thus, an image can be taken with both focus and composition that are intended by the photographer.

Embodiment 2

[2-1. Configuration and Operation]

The configuration of a twin-lens camera having two imaging units as Embodiment 2 will be described.

Figure 6:
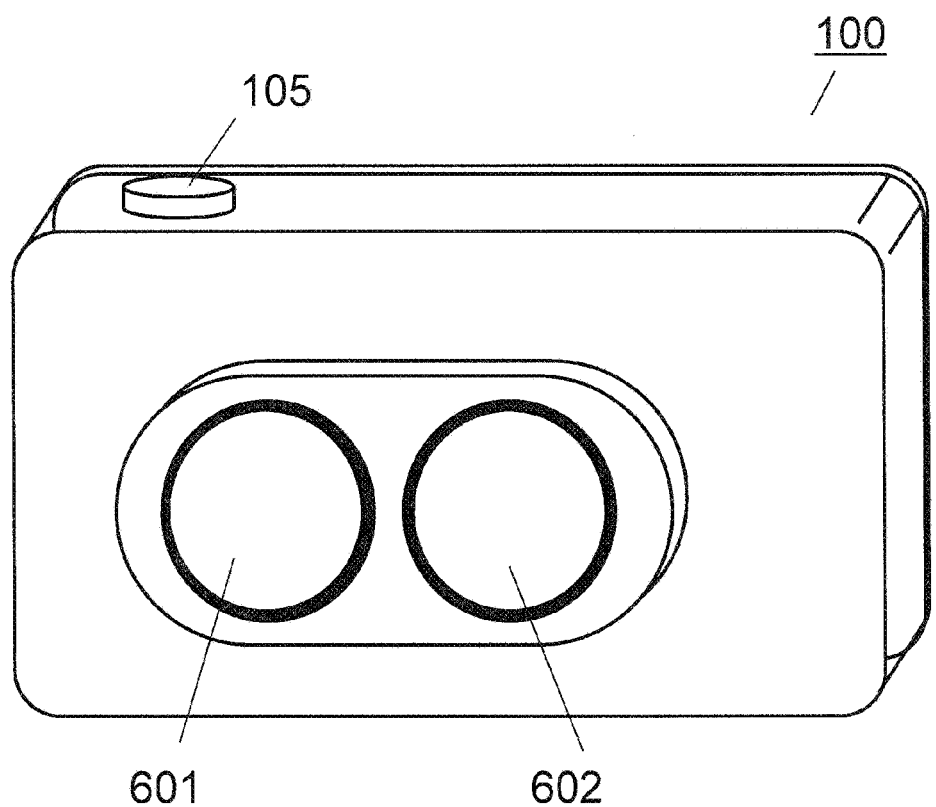
FIG. 6 is an external view of an imaging device according to Embodiment 2.

FIG. 6 is an external view of an imaging device according to Embodiment 2. The imaging device 100 includes a first imaging optical system 601, a second imaging optical system 602, and a shutter button 105.

Figure 7:
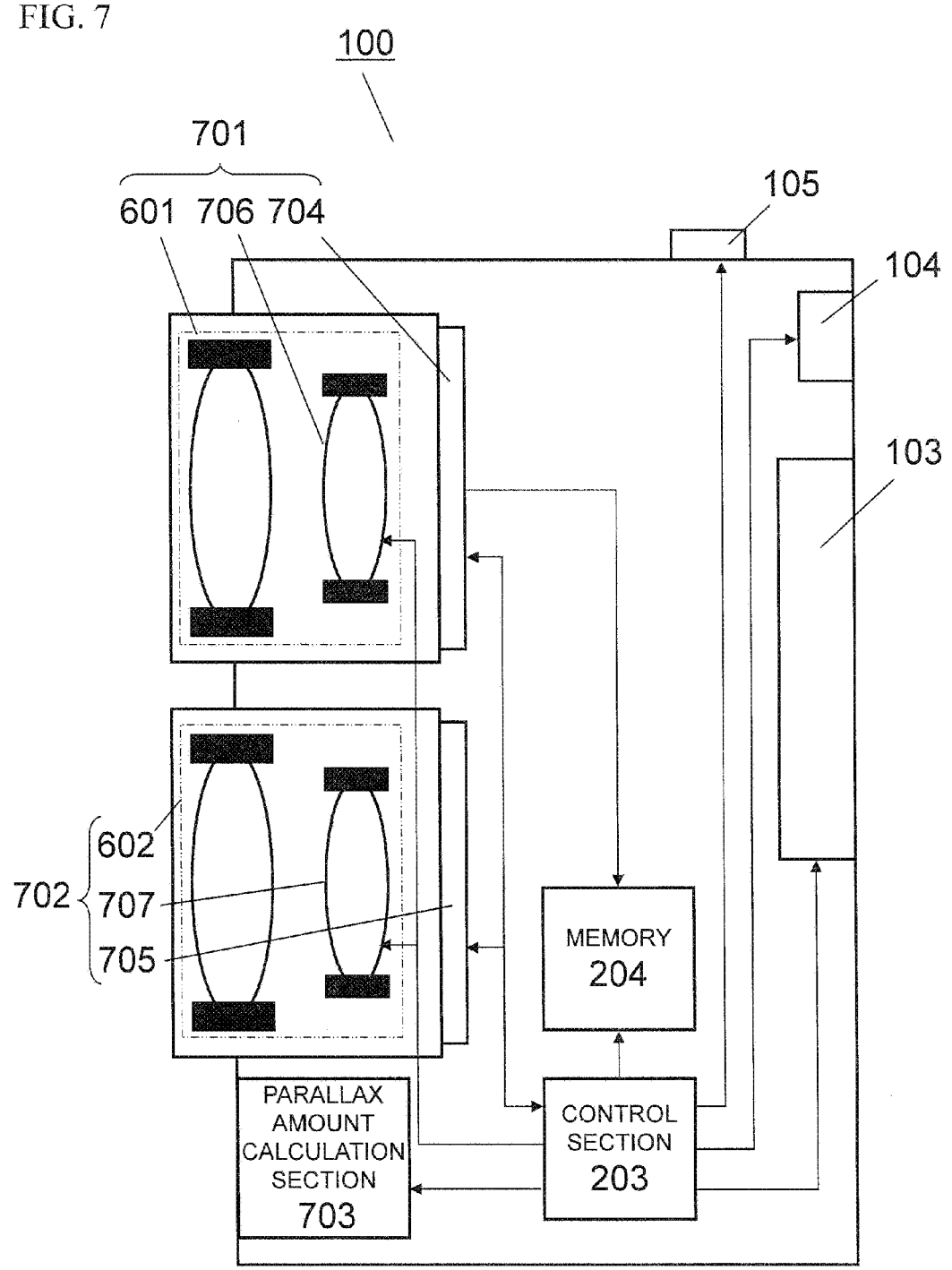
FIG. 7 is a block diagram for illustrating the internal configuration of the imaging device according to Embodiment 2.

FIG. 7 is a block diagram showing the internal structure of the imaging device shown in FIG. 6. The imaging device 100 includes a first imaging unit 701, a second imaging unit 702, a parallax amount calculation section 703, a control section 203, a memory 204, an image display section 103, a distance designation section 104, and the shutter button 105.

The first imaging unit 701 includes a first imaging element 704 and the first imaging optical system 601 which includes a plurality of lenses for forming a shot image. The first imaging optical system 601 has a function to shift a focus lens 706 to achieve focus. The first imaging element 704 is a photoelectric conversion device which converts a formed object image into an electrical signal (image signal), and corresponds to, for example, a CCD image sensor or a CMOS image sensor.

The second imaging unit 702 includes a second imaging element 705 and the second imaging optical system 602 which includes a plurality of lenses for forming a shot image. The second imaging optical system 602 has a function to shift a focus lens 707 to achieve focus. The second imaging element 705 is a photoelectric conversion device which converts a formed object image into an electrical signal (image signal), and corresponds to, for example, a CCD image sensor or a CMOS image sensor.

The parallax amount calculation section 703 calculates a parallax amount from image information obtained from the first imaging unit 701 and the second imaging unit 702. The control section 203 calculates the distance to an object on the basis of information of the parallax amount obtained thus, and controls both the first imaging unit 701 and the second imaging unit 702 such that the focus lens unit of the first imaging optical system 601 and the focus lens unit of the second imaging optical system 602 achieve focus at a desired shooting distance designated by using the distance designation section 104.

[2-2. Advantageous Effects etc.]

As described above, according to Embodiment 2, in the case of a twin-lens camera such as a camera for 3D shooting, the distance to an object can be calculated from a parallax amount between images obtained from the two imaging optical systems. Because of this, a shooting operation is assuredly performed when an object which is desired to be shot moves to a distance at which shooting is desired. Thus, an image can be taken with both focus and composition that are intended by the photographer.

In the above description, the case has been described in which both the first imaging unit 701 and the second imaging unit 702 are previously caused to achieve focus on a predetermined object at a distance at which shooting is desired. However, only either one imaging unit used to obtain an image may be caused to achieve focus on a predetermined object. In such a case, the imaging unit that is not used for shooting continuously performs a focusing operation so as to constantly follow the object that is a shooting target. By using information obtained during the focusing operation, distance information of the object can be obtained. Because of this, it is also possible to omit the parallax amount calculation section 703.

In the present embodiment, the first imaging unit 701 and the second imaging unit 702 may have the same configuration with the same lens system or may have different configurations. For example, the size of the imaging optical system or the imaging element may be different between the first imaging unit 701 and the second imaging unit 702. In such a case, when a small-size imaging unit is used as either one imaging unit, it is possible to reduce the size of the imaging device 100.

Furthermore, in the case where each of the first imaging optical system 601 and the second imaging optical system 602 is a zoom lens system, the view angle of the first imaging optical system 601 may be different from the view angle of the second imaging optical system 602. In such a case, when the view angle of the imaging unit that is not used for shooting is set so as to be higher than the view angle of the imaging unit that is used for shooting, even in the case where an object is out of a shooting range of the imaging unit that is used for shooting, it is possible to detect the position of the object, and thus detection of and distance measurement for the object can easily be performed.

Other Embodiments

In addition, in all the embodiments of the present disclosure, in addition to the distance to the object, it is also possible to designate a position of the object on a composition with which shooting is desired. When it is configured thus, it is possible to obtain a picture in which an object is located at a position, on a composition, which is intended by the photographer.

Figure 8A:
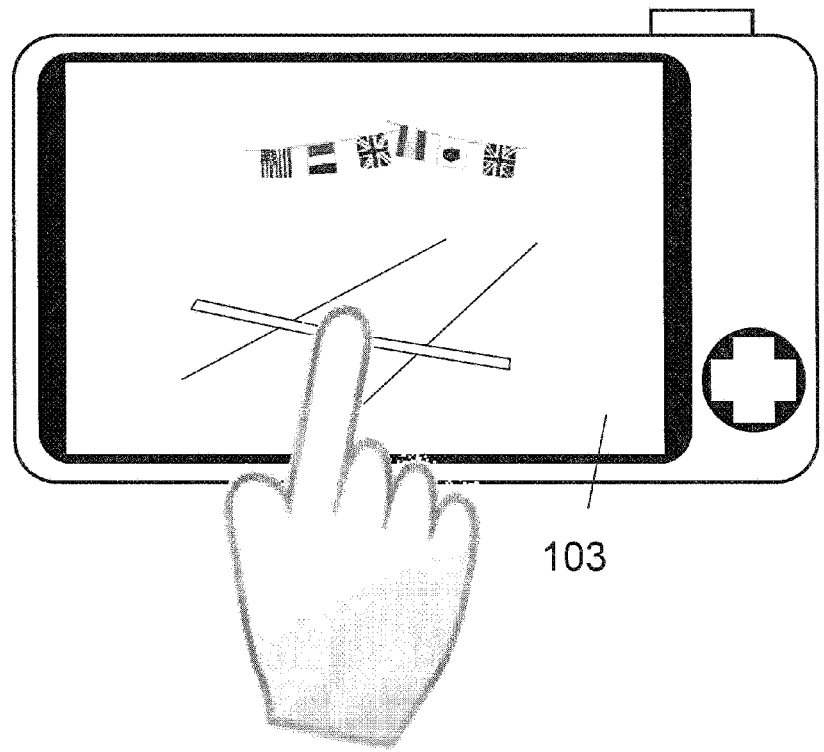
FIG. 8A is a diagram showing an example of designation of a shooting distance in another embodiment.

Furthermore, as shown in FIG. 8A, in the case where a display element having a touch input function is used as the image display section 103, designation of an object 301 at a distance at which shooting is desired, on a shooting composition, may be performed by touching the corresponding location on an image with a finger or the like.

Figure 8B:
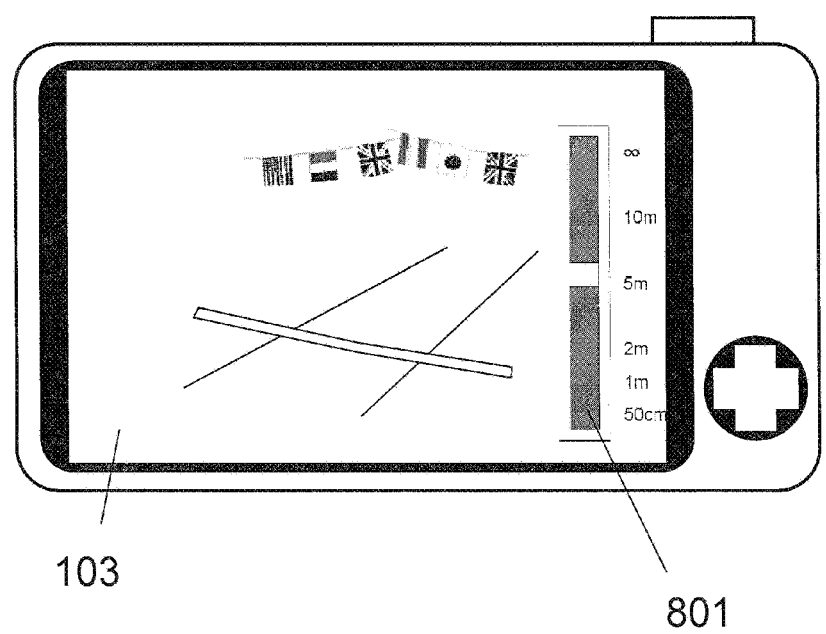
FIG. 8B is a diagram showing an example of designation of a shooting distance in another embodiment.

Moreover, as shown in FIG. 8B, designation of a distance at which shooting is desired may be performed by swiping, with a finger or the like, a shooting distance designation bar 801 which is displayed on the image display section 103.

By so doing, a shooting operation is assuredly performed when an object which is desired to be shot moves to a distance at which shooting is desired. Thus, an image can be taken with both focus and composition that are intended by the photographer.

The present disclosure is applicable to various imaging devices such as a compact digital camera, an interchangeable-lens type camera system, a video camera, a camera-equipped cellular phone, a smart phone, and a tablet computer.

The embodiments have been described above as illustrative examples of the technology in the present disclosure. For that, the accompanying drawings and the detailed description have been provided.

Therefore, the constituent elements described in the accompanying drawings and the detailed description may include not only constituent elements essential for solving the problems but also constituent elements non-essential for solving the problems, in order to illustrate the technology described above. Thus, these non-essential constituent elements should not be readily recognized as being essential, due to these non-essential constituent elements being described in the accompanying drawings and the detailed description.

Furthermore, since the embodiments described above are intended to illustrate the technology in the present disclosure, various changes, substitutions, additions, omissions, and the like can be made within the scope of the claims and the scope of equivalents thereof.

The present disclosure is applicable to an imaging device that can achieve focus with high accuracy by simple scanning when shooting a moving object, and is very suitable as an imaging device for general users.

What is claimed is:

1. An imaging device comprising:
    an imager including an imaging optical system that forms an image of an object, and an imaging element that converts an optical image formed by the imaging optical system into an image signal and outputs the image signal;
    a distance measurer that obtains first distance information of the object;
    an image display that displays an image of the image signal;
    an object recorder that previously registers and records an object to be shot; and
    a distance designator that designates a second distance at which the object is to be shot; wherein
    the imaging optical system performs a focusing operation for the second distance, designated by the distance designator, before the distance measurer obtains the first distance information, and
    the imager performs shooting exposure when the object which is previously recorded by the object recorder is located at the second distance, designated by the distance designator.

2. The imaging device according to claim 1, wherein
    the image display further includes a touch input device that receives a touch input performed by a user, and
    the distance designator designates the second distance, at which the object is to be shot, on the basis of a touch input at at least one location on the image displayed on the image display, the touch input being received by the touch input device.

* * * * *